(12) United States Patent
Kim et al.

(10) Patent No.: US 11,115,884 B1
(45) Date of Patent: Sep. 7, 2021

(54) ADJUSTING HANDOVER PARAMETERS FOR MASSIVE MIMO WIRELESS DEVICES

(71) Applicant: Sprint Spectrum LP, Overland Park, KS (US)

(72) Inventors: Yun Sung Kim, Ashburn, VA (US); Sandeep Mangrulkar, Chantilly, VA (US); Minho Song, Ashburn, VA (US); Sanghoon Sung, Ashburn, VA (US)

(73) Assignee: T-Mobile Innovations LLC, Overland Park, KS (US)

( * ) Notice: Subject to any disclaimer, the term of this patent is extended or adjusted under 35 U.S.C. 154(b) by 102 days.

(21) Appl. No.: 16/516,804

(22) Filed: Jul. 19, 2019

(51) Int. Cl.
*H04W 36/08* (2009.01)
*H04W 36/00* (2009.01)
*H04L 5/00* (2006.01)
*H04B 7/0413* (2017.01)

(52) U.S. Cl.
CPC .... *H04W 36/00837* (2018.08); *H04B 7/0413* (2013.01); *H04L 5/0048* (2013.01); *H04W 36/08* (2013.01)

(58) Field of Classification Search
CPC ....... H04W 36/00837; H04W 12/1202; H04W 24/10; H04B 7/0413
See application file for complete search history.

(56) References Cited

U.S. PATENT DOCUMENTS

2019/0075496 A1   3/2019   Huang et al.

*Primary Examiner* — Wei Zhao

(57) ABSTRACT

A serving access node is determined as being capable of transmitting a mMIMO signal, responsive to which handover parameters are adjusted for wireless devices attached to the serving access node and receiving the mMIMO signal. Wireless devices attached to a sector deployed by a first access node and not the mMIMO signal are configured to utilize different handover parameters such that the non mMIMO wireless devices request handovers using standard signal level thresholds.

18 Claims, 5 Drawing Sheets

ADJUSTING HANDOVER PARAMETERS FOR MASSIVE MIMO WIRELESS DEVICES

TECHNICAL BACKGROUND

As wireless networks evolve and grow, there are ongoing challenges in providing high-quality service to increasing numbers of wireless devices in various coverage areas of a wireless network. Wireless networks may be configured to utilize massive multiple-input multiple-output (mMIMO), in which multiple data streams can be directed towards a plurality of wireless devices that are selected to participate in a MIMO operating mode based on the orthogonality of transmission, thereby maximizing resources. MIMO has been identified as one of the promising air interface technologies to address the capacity requirement required demanded by 5G networks, and increasingly access nodes with multiple antenna arrays are being deployed in wireless networks.

However, the combination of mMIMO enabled access nodes and wireless devices with non mMIMO access nodes and wireless devices incapable of using this technology can create challenges for load balancing between access nodes in the wireless network, particularly as different types of wireless devices (such as those receiving mMIMO signals versus those that do not receive mMIMO signals) experience varying levels of service from the same access node and at different locations. In other words, there is a need for balancing the number of wireless devices utilizing mMIMO versus those that do not, such that the gains from the MU-MIMO mode of operation can be realized for the mMIMO wireless devices.

OVERVIEW

Exemplary embodiments described herein include systems, methods, and processing nodes for adjusting handover parameters for wireless devices participating in massive MIMO (mMIMO). An exemplary method for adjusting handover parameters includes determining that a serving access node is capable of transmitting a mMIMO signal and, responsive to determining that the serving access node is capable of transmitting the mMIMO signal, adjusting a handover parameter for wireless devices attached to the serving access node and receiving the mMIMO signal from the serving access node.

An exemplary system for adjusting handover parameters includes a processing node and a processor coupled to the processing node. The processor enables the processing node to perform operations comprising determining that a serving access node is capable of transmitting a mMIMO signal, identifying a neighboring access node adjacent to the serving access node, wherein an overlapping region exists between coverage areas of the serving access node and the neighboring access node, and adjusting a handover parameter for wireless devices attached to the serving access node such that a first wireless device receiving the mMIMO signal and located closer to the neighboring access node remains attached to the serving access node.

An exemplary processing node for adjusting handover parameters is configured to perform operations comprising identifying a first wireless device attached to a sector deployed by a first access node, identifying a second wireless device attached to a mMIMO signal deployed by the first access node, and setting different handover parameters for the first and second wireless devices, wherein a first handover parameter for the first wireless device is lower than a second handover parameter for the second wireless device.

DETAILED DESCRIPTION

Figure 1:
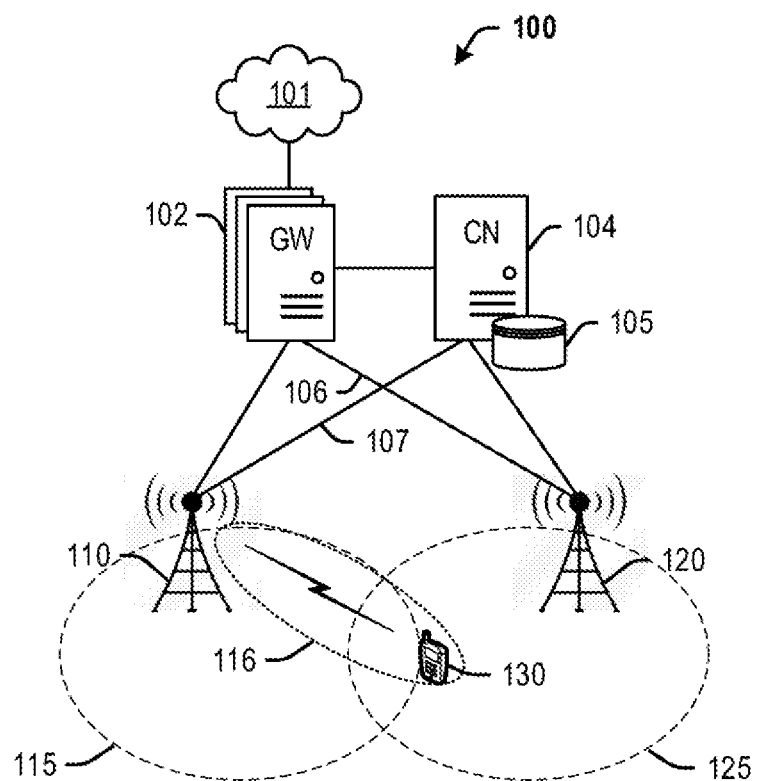
FIG. 1 depicts an exemplary system for adjusting handover parameters for mMIMO wireless devices.

A method described herein for adjusting handover parameters comprises adjusting one or more handover parameters for wireless devices receiving a mMIMO signal from a serving access node. The adjustment may be performed responsive to determining that the serving access node is capable of transmitting the mMIMO signal. For example, the serving access node may include an access node of any type, including macrocell access nodes such as Long-Term-Evolution (LTE) eNodeBs or 5G New Radio (NR) gNodeBs, mini access nodes, home eNodeBs or gNodeBs, etc. Such serving access nodes may comprise a plurality of antennae configured to deploy a wireless sector, and to form transmission beams (including mMIMO beams) to specific locations such that wireless devices at the specific locations can receive the mMIMO beams. The handover parameters can be adjusted such that wireless devices attached to mMIMO beams remain attached to the mMIMO beams despite being outside a coverage area of a sector of the serving access node. For example, adjusting the handover parameters includes lowering a signal level threshold of a reference signal transmitted from the serving access node. Thus, wireless devices attached to the serving access node and receiving mMIMO beams do not request a handover to a neighboring access node until the signal level threshold of the reference signal meets the low threshold. For example, the wireless devices may be traveling towards an edge of the coverage area of a sector deployed by the serving access node, and may even travel past the edge of the coverage area. Such wireless devices remain attached to the serving access node by virtue of the range of the mMIMO beam exceeding the range of the sector. In contrast, wireless devices that are attached to the serving access node but not receiving a mMIMO signal continue to be assigned standard handover parameters, such as a higher signal level threshold of the reference signal transmitted by the serving access node. Such wireless devices would request a handover to a neighboring access node based on standard handover parameters. For the purposes of this disclose, wireless devices attached to the serving access node and receiving the mMIMO signals may be referred to as "mMIMO wireless devices", and wireless devices attached to the serving access node and not receiving the mMIMO signals may be referred to as "sector wireless devices."

In exemplary embodiments described herein, a neighboring access node adjacent to the serving access node is identified, wherein there is an overlapping region between the coverage areas of both serving and neighboring access nodes. In such embodiments, adjusting the handover parameter can include one or both of lowering a first signal level threshold of a first reference signal transmitted from the serving access node, or raising a second signal level threshold of a second reference signal transmitted from the neighboring access node. In effect, a first wireless device receiving the mMIMO signal remains attached to the serving access node until one or more of the first signal level threshold or the second signal level threshold is reached. For example, the first wireless device requests a handover to the neighboring access node when one or more of the first signal level threshold or the second signal level threshold is reached. In contrast, standard or default handover parameters are maintained for sector wireless devices (i.e. wireless devices not receiving the mMIMO signal), such that a sector wireless device requests a handover to the neighboring access node when standard or default signal level thresholds are met. Further, the standard or default handover parameters may be maintained for any wireless device not receiving the mMIMO signal, such as wireless devices that are not attached to any sector deployed by the serving access node. Such wireless devices may attempt to attach to the serving access node based on the default handover parameters. For example, a wireless device located outside the coverage area of the sector and approaching the edge of the sector may request a handover (or to attach) to the serving access node based on the standard or default signal level threshold of the reference signal transmitted from the serving access node.

In an exemplary embodiment, the neighboring access node may also be capable of transmitting a mMIMO signal. In these embodiments, a second handover parameter for wireless devices attached to the neighboring access node may be defined, such that a wireless device receiving the second mMIMO signal remains attached to the neighboring access node while being located outside an edge of the coverage area of the neighboring access node. For example, adjusting the second handover parameter can include one or both of lowering a signal level threshold of the second reference signal transmitted from the neighboring access node, or raising a signal level threshold of the first reference signal transmitted from the serving access node. As a result, the wireless device receiving the second mMIMO signal remains attached to the neighboring access node until one or more of the adjusted signal level thresholds are reached. Conversely, sector wireless devices attached to the neighboring access node request handovers based on default or standard handover parameters, such as default or standard signal level thresholds.

Similar operations may be performed by an exemplary system described herein and comprising at least a processing node and a processor coupled to the processing node. A processing node in such an exemplary system may be configured to perform operations including determining that a serving access node is capable of transmitting a mMIMO signal, identifying a neighboring access node adjacent to the serving access node, wherein an overlapping region exists between coverage areas of the serving access node and the neighboring access node, and adjusting a handover parameter for wireless devices attached to the serving access node such that a first wireless device receiving the mMIMO signal and located closer to the neighboring access node remains attached to the serving access node. Adjusting the handover parameter can include one or both of lowering a first signal level threshold of a first reference signal transmitted from the serving access node, or raising a second signal level threshold of a second reference signal transmitted from the neighboring access node. Thus, the first wireless device remains attached to the serving access node until one or more of the first signal level threshold or the second signal level threshold is reached, and requests a handover to the neighboring access node when one or more of the first signal level threshold or the second signal level threshold is reached. According to an embodiment, the operations can further include determining that the neighboring access node is capable of transmitting a second mMIMO signal, and adjusting a second handover parameter for wireless devices attached to the neighboring access node. Based on the adjusted second handover parameter, a second wireless device attached to the neighboring access node and traveling away from the center of a coverage area of the neighboring access node towards an edge of the coverage area of the neighboring access node remains attached to the neighboring access node.

Similar operations may be performed by a processing node communicatively coupled to any other network node within the wireless network. The processing node can be coupled to a serving access node, or a controller node. Consequently, an exemplary processing node can be configured to perform operations including identifying a first wireless device attached to a sector deployed by a first access node, identifying a second wireless device attached to a mMIMO signal deployed by the first access node, and setting different handover parameters for the first and second wireless devices. A first handover parameter for the first wireless device is set lower than a second handover parameter for the second wireless device, such that a first handover of the first wireless device to a target access node is performed when the first handover parameter is reached, and a second handover of the second wireless device to the target access node is performed when the second handover parameter is reached. In effect, the second wireless device is handed over to the target access node at a further distance away from the first than the first wireless device, so as to retain the benefit of the mMIMO signal.

These and other embodiments are further described herein and with reference to FIGS. 1-8 below.

FIG. 1 depicts an exemplary system 100 comprising a communication network 101, gateway 102, controller node 104, access node 110, access node 120, and wireless device 130. Access node 110 is configured to deploy a radio air interface over a coverage area 115, and access node 120 is configured to deploy a radio air interface over a coverage area 125. Further, access node 110 is illustrated as deploying a mMIMO signal 116 over a coverage area that extends beyond sector coverage area 115. Thus, wireless device 130 is illustrated as being in communication with access node 110 via mMIMO beam 116, despite the location of wireless device 130 being outside of sector coverage area 115. For example, a processing node within system 100 (for example, communicatively coupled to access nodes 110, 120, controller node 104, or any other network node) can be configured to adjust one or more handover parameters for mMIMO wireless device 130 responsive to determining that the serving access node 110 is capable of transmitting the mMIMO signal 116. For example, the serving access node 110 may comprise a plurality of antennae configured to deploy one or more wireless sectors over a coverage area 115, and to form transmission beams (including mMIMO signal/beam 116) to specific locations, such that wireless devices at the specific locations (such as wireless device 130) can receive the mMIMO signal 116. The handover parameters can be adjusted such that mMIMO wireless devices attached to mMIMO beams remain attached to the mMIMO beams despite being outside sector coverage area 115. For example, adjusting the handover parameters includes lowering a signal level threshold of a reference signal transmitted from the serving access node 110. Thus, mMIMO wireless device 130 does not request a handover to the neighboring access node 120 until the signal level threshold of the reference signal meets the low threshold. If mMIMO wireless device 130 is traveling past the edge of the sector coverage area 115, it therefore remains attached to the serving access node 110 by virtue of the range of the mMIMO signal 116 exceeding the sector coverage area 115. In contrast, sector wireless devices (e.g. wireless devices that are attached to the serving access node 110 but not receiving a mMIMO signal) continue to be assigned standard handover parameters, such as a higher signal level threshold of the reference signal transmitted by the serving access node 110.

Further, adjusting the handover parameter can include one or both of lowering a first signal level threshold of a first reference signal transmitted from the serving access node 110, or raising a second signal level threshold of a second reference signal transmitted from the neighboring access node 120. In effect, mMIMO wireless device 130 remains attached to the serving access node 110 until one or more of the first signal level threshold or the second signal level threshold is reached. For example, the mMIMO wireless device 130 requests a handover to the neighboring access node 120 when one or more of the first signal level threshold or the second signal level threshold is reached. In contrast, standard or default handover parameters are maintained for sector wireless devices (i.e. wireless devices not receiving the mMIMO signal), such that a sector wireless device requests a handover to the neighboring access node 120 when standard or default signal level thresholds are met. Further, the standard or default handover parameters may be maintained for any wireless device not receiving the mMIMO signal, such as wireless devices that are not attached to any sector deployed by the serving access node 110 (not shown herein). Such wireless devices may attempt to attach to the serving access node based on the default handover parameters. For example, a wireless device located outside the coverage area of the sector 115 and approaching the edge of the sector 115 may request a handover (or to attach) to the serving access node 110 based on the standard or default signal level threshold of the reference signal transmitted from the serving access node.

In an exemplary embodiment, the neighboring access node 120 may also be capable of transmitting a mMIMO signal. In these embodiments, a second handover parameter for wireless devices attached to the neighboring access node 120 may be defined, such that a wireless device receiving the second mMIMO signal (not shown herein) remains attached to the neighboring access node 120 while being located outside an edge of the coverage area 125 of the neighboring access node. For example, adjusting the second handover parameter can include one or both of lowering a signal level threshold of the second reference signal transmitted from the neighboring access node 120, or raising a signal level threshold of the first reference signal transmitted from the serving access node 110. As a result, the wireless device receiving the second mMIMO signal remains attached to the neighboring access node 120 until one or more of the adjusted signal level thresholds are reached. Conversely, sector wireless devices attached to the neighboring access node 120 request handovers based on default or standard handover parameters, such as default or standard signal level thresholds.

In another exemplary embodiment, a processing node within system 100 can be configured to perform operations including determining that serving access node 110 is capable of transmitting a mMIMO signal, identifying neighboring access node 120 adjacent to the serving access node 110, wherein an overlapping region exists between coverage areas 115, 125, and adjusting a handover parameter for mMIMO wireless devices (such as wireless device 130) such that wireless device 130 remains attached to the serving access node despite being located closer to neighboring access node 120. Adjusting the handover parameter can include one or both of lowering a first signal level threshold of a first reference signal transmitted from the serving access node 110, or raising a second signal level threshold of a second reference signal transmitted from the neighboring access node 120. Thus, the mMIMO wireless device 130 remains attached to the serving access node 110 until one or more of the first signal level threshold or the second signal level threshold is reached, and requests a handover to the neighboring access node 120 when one or more of the first signal level threshold or the second signal level threshold is reached.

Access nodes 110, 120 can be any network node configured to provide communication between wireless devices attached thereto and communication network 101, including standard access nodes such as a macro-cell access node, base transceiver station, a radio base station, an eNodeB device, an enhanced eNodeB device, an a next generation or gigabit NodeB device (gNodeB) in 5G networks, or the like. In an exemplary embodiment, a macro-cell access node can have a coverage area 115, 125 in the range of approximately five kilometers to thirty-five kilometers and an output power in the tens of watts. Further, access nodes 110, 120 may comprise any short range, low power, small-cell access nodes such as a microcell access node, a picocell access node, a femtocell access node, or a home eNodeB device.

Access nodes 110, 120 can comprise a processor and associated circuitry to execute or direct the execution of computer-readable instructions to perform operations such as those further described herein. Briefly, access nodes 110, 120 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Further, access nodes 110, 120 can receive instructions and other input at a user interface. Access nodes 110, 120 communicate with gateway node 102 and controller node 104 via communication links 106, 107. Access nodes 110, 120 may communicate with each other, and other access nodes (not shown), using a wireless link or a wired link such as an X2 link. Components of exemplary access nodes 110, 120 and processing nodes coupled thereto, are further described with reference to FIGS. 2-3.

Wireless device 130 may be any device, system, combination of devices, or other such communication platform capable of communicating wirelessly with access node 110, 120 using one or more frequency bands deployed therefrom. Wireless device 130 may be, for example, a mobile phone, a wireless phone, a wireless modem, a personal digital assistant (PDA), a voice over internet protocol (VoIP)

phone, a voice over packet (VOP) phone, or a soft phone, as well as other types of devices or systems that can send and receive audio or data. Other types of communication platforms are possible.

Communication network 101 can be a wired and/or wireless communication network, and can comprise processing nodes, routers, gateways, and physical and/or wireless data links for carrying data among various network elements, including combinations thereof, and can include a local area network a wide area network, and an internetwork (including the Internet). Communication network 101 can be capable of carrying data, for example, to support voice, push-to-talk, broadcast video, and data communications by wireless device 130. Wireless network protocols can comprise MBMS, code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), Worldwide Interoperability for Microwave Access (WiMAX), Fourth Generation broadband cellular (4G, LTE Advanced, etc.), and Fifth Generation mobile networks or wireless systems (5G, 5G New Radio ("5G NR"), or 5G LTE). Wired network protocols that may be utilized by communication network 101 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 101 can also comprise additional base stations, controller nodes, telephony switches, internet routers, network gateways, computer systems, communication links, or some other type of communication equipment, and combinations thereof.

Communication links 106, 107 can use various communication media, such as air, space, metal, optical fiber, or some other signal propagation path—including combinations thereof. Communication links 106, 107 can be wired or wireless and use various communication protocols such as Internet, Internet protocol (IP), local-area network (LAN), optical networking, hybrid fiber coax (HFC), telephony, T1, or some other communication format—including combinations, improvements, or variations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), Long Term Evolution (LTE), 5G NR, or combinations thereof. Communication links 106, 107 may include Si communication links. Other wireless protocols can also be used. Communication links 106, 107 can be a direct link or might include various equipment, intermediate components, systems, and networks. Communication links 106, 107 may comprise many different signals sharing the same link.

Gateway node 102 can be any network node configured to interface with other network nodes using various protocols. Gateway node 102 can communicate user data over system 100. Gateway node 102 can be a standalone computing device, computing system, or network component, and can be accessible, for example, by a wired or wireless connection, or through an indirect connection such as through a computer network or communication network. For example, gateway node 102 can include a serving gateway (SGW) and/or a public data network gateway (PGW), etc. One of ordinary skill in the art would recognize that gateway node 102 is not limited to any specific technology architecture, such as Long Term Evolution (LTE) or 5G NR, and can be used with any network architecture and/or protocol.

Gateway node 102 can comprise a processor and associated circuitry to execute or direct the execution of computer-readable instructions to obtain information. Gateway node 102 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Gateway node 102 can receive instructions and other input at a user interface.

Controller node 104 can be any network node configured to communicate information and/or control information over system 100. Controller node 104 can be configured to transmit control information associated with a handover procedure. Controller node 104 can be a standalone computing device, computing system, or network component, and can be accessible, for example, by a wired or wireless connection, or through an indirect connection such as through a computer network or communication network. For example, controller node 104 can include a mobility management entity (MME), a Home Subscriber Server (HSS), a Policy Control and Charging Rules Function (PCRF), an authentication, authorization, and accounting (AAA) node, a rights management server (RMS), a subscriber provisioning server (SPS), a policy server, etc. One of ordinary skill in the art would recognize that controller node 104 is not limited to any specific technology architecture, such as Long Term Evolution (LTE) or 5G NR, and can be used with any network architecture and/or protocol.

Controller node 104 can comprise a processor and associated circuitry to execute or direct the execution of computer-readable instructions to obtain information. Controller node 104 can retrieve and execute software from storage, which can include a disk drive, a flash drive, memory circuitry, or some other memory device, and which can be local or remotely accessible. In an exemplary embodiment, controller node 104 includes a database 105 for storing information related to elements within system 100, such as threshold signal levels associated with access nodes 110, 120, mMIMO capabilities of access nodes 110, 120, and so on. This information may be requested by or shared with access nodes 110, 120 via communication links 106, 107, X2 connections, and so on. The software comprises computer programs, firmware, or some other form of machine-readable instructions, and may include an operating system, utilities, drivers, network interfaces, applications, or some other type of software, and combinations thereof. For example, a processing node within controller node 104 can perform the operations described herein. Further, controller node 104 can receive instructions and other input at a user interface.

Other network elements may be present in system 100 to facilitate communication but are omitted for clarity, such as base stations, base station controllers, mobile switching centers, dispatch application processors, and location registers such as a home location register or visitor location register. Furthermore, other network elements that are omitted for clarity may be present to facilitate communication, such as additional processing nodes, routers, gateways, and physical and/or wireless data links for carrying data among the various network elements, e.g. between access node 110 and communication network 101.

Further, the methods, systems, devices, networks, access nodes, and equipment described above may be implemented with, contain, or be executed by one or more computer systems and/or processing nodes. The methods described above may also be stored on a non-transitory computer readable medium. Many of the elements of communication systems 100 may be, comprise, or include computers systems and/or processing nodes. This includes, but is not limited to: access nodes 110, 120, relay node 140, controller node 104, and/or networks 101, 201.

Figure 2:
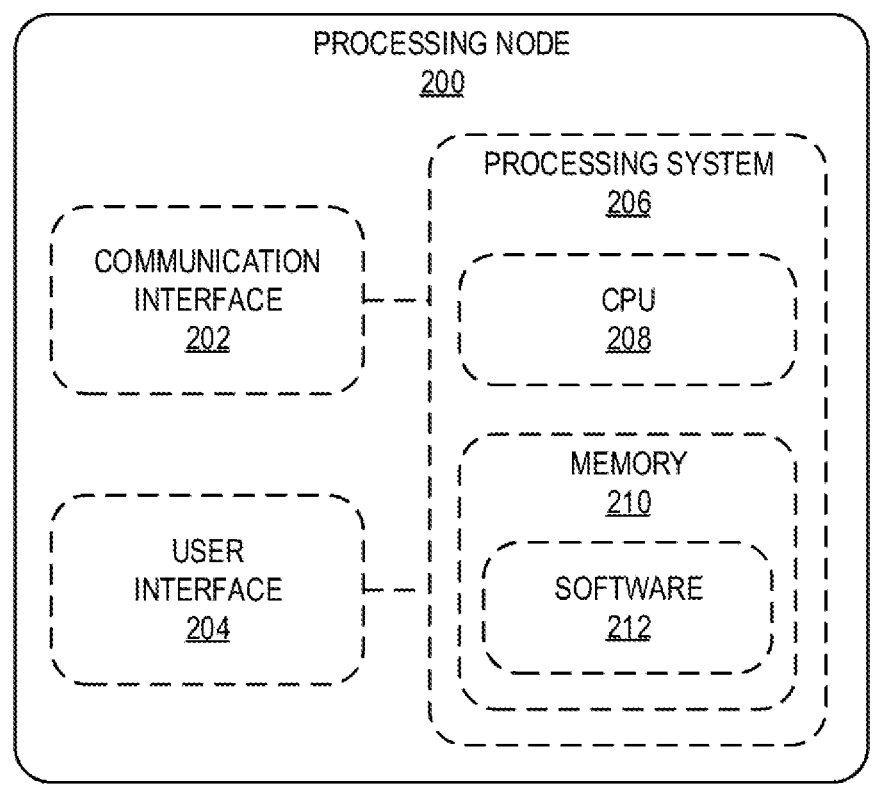
FIG. 2 depicts an exemplary processing node for adjusting handover parameters for mMIMO wireless devices.

FIG. 2 depicts an exemplary processing node 200. Processing node comprises a communication interface 202, user interface 204, and processing system 206 in communication with communication interface 202 and user interface 204. Processing system 206 includes a central processing unit (CPU) 208, and a memory 210, which can comprise a disk drive, flash drive, memory circuitry, or other memory device. Memory 210 can store computer programs, firmware, or some other form of machine-readable instructions, including an operating system, utilities, drivers, network interfaces, applications, or some other type of software. Further, memory 210 can store a software 212, which may be executed to perform the handover parameter adjustment operations described herein. Processing system 206 may include other circuitry to retrieve and execute software 212 from memory 210. Processing node 200 may further include other components such as a power management unit, a control interface unit, etc., which are omitted for clarity. Communication interface 202 permits processing node 200 to communicate with other network elements. User interface 204 permits the configuration and control of the operation of processing node 200.

In an exemplary embodiment, software 212 can include instructions for adjusting handover parameters for access nodes capable of transmitting massive multiple-input multiple-output (mMIMO) signals by determining that a serving access node is capable of transmitting a mMIMO signal and, responsive to determining that the serving access node is capable of transmitting the mMIMO signal, adjusting a handover parameter for wireless devices attached to the serving access node and receiving the mMIMO signal from the serving access node.

In another exemplary embodiment, software 212 can include instructions for determining that a serving access node is capable of transmitting a mMIMO signal, identifying a neighboring access node adjacent to the serving access node, wherein an overlapping region exists between coverage areas of the serving access node and the neighboring access node, and adjusting a handover parameter for wireless devices attached to the serving access node such that a first wireless device receiving the mMIMO signal and located closer to the neighboring access node remains attached to the serving access node.

In another exemplary embodiment, software 212 can include instructions for identifying a first wireless device attached to a sector deployed by a first access node, identifying a second wireless device attached to a mMIMO signal deployed by the first access node, and setting different handover parameters for the first and second wireless devices, wherein a first handover parameter for the first wireless device is lower than a second handover parameter for the second wireless device.

Figure 3:
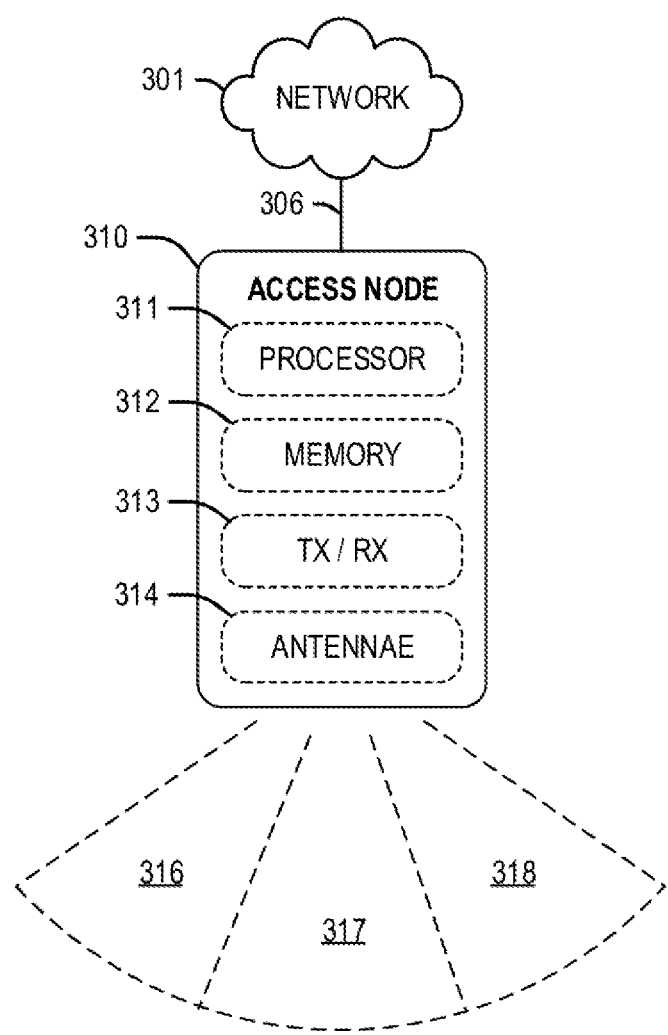
FIG. 3 depicts an exemplary access node for adjusting handover parameters for mMIMO wireless devices.

FIG. 3 depicts an exemplary access node 310. Access node 310 may comprise, for example, a macro-cell access node, such as access node 110 described with reference to FIG. 1. Access node 310 is illustrated as comprising a processor 311, memory 312, transceiver 313, and a plurality of antennae 314. Processor 311 executes instructions stored on memory 312, while transceiver 313 and antennae 314 enable access node 310 to deploy wireless air interfaces over wireless sectors 316, 317, and 318. For example, antennae 314 may include an array of antennae that are configured to deploy a radio air interface over wireless sectors 316, 317, 318, form beams within these sectors, transmit mMIMO beams/signals, etc.

In an exemplary embodiment, memory 312 can include instructions for adjusting handover parameters for access nodes capable of transmitting massive multiple-input multiple-output (mMIMO) signals by determining that access node 310 is capable of transmitting a mMIMO signal and, responsive to determining that access node 310 is capable of transmitting the mMIMO signal, adjusting a handover parameter for wireless devices attached to access node 310 and receiving the mMIMO signal from the serving access node. The wireless devices may be located in or near one or more of sectors 316, 317, 318. Further, different handover parameters may be set for mMIMO wireless devices in different sectors 316, 317, 318, depending on a presence or proximity of neighboring access nodes adjacent each sector 316, 317, 318.

In another exemplary embodiment, memory 312 can include instructions for determining that access node 310 is capable of transmitting a mMIMO signal, identifying a neighboring access node adjacent to one or more sectors 316, 317, 318 of access node 310, wherein an overlapping region exists between coverage areas of sectors 316, 317, 318 and sectors of the neighboring access node, and adjusting a handover parameter for wireless devices attached to the access node 310 and within one of sectors 316, 317, 318 such that a wireless device receiving the mMIMO signal in one of sectors 316, 317, 318 and located closer to the neighboring access node remains attached to the access node 310. Whereas, sector wireless devices within one or more of sectors 316, 317, 318 request or trigger handovers to neighboring access nodes based on standard or default handover parameters.

In another exemplary embodiment, memory 312 can include instructions for identifying a first wireless device attached to a sector beam within one of sectors 316, 317, 318, identifying a second wireless device attached to a mMIMO signal deployed by the access node 310, and setting different handover parameters for the first and second wireless devices, wherein a first handover parameter for the first wireless device is lower than a second handover parameter for the second wireless device.

Figure 4:
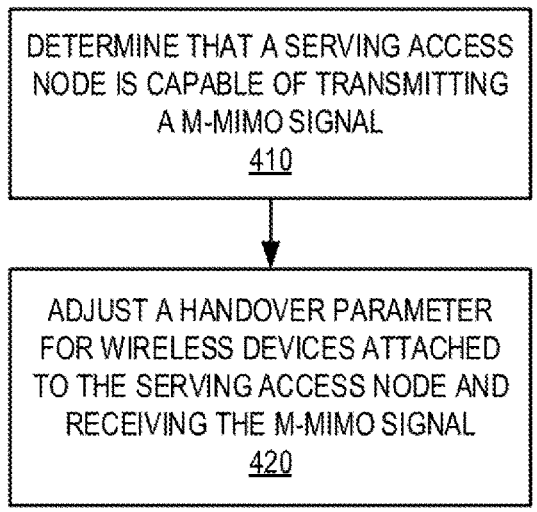
FIG. 4 depicts an exemplary method for adjusting handover parameters for mMIMO wireless devices.

FIG. 4 depicts an exemplary method for adjusting handover parameters. The method of FIG. 4 may be implemented by a processing node communicatively coupled to one or more serving access nodes, controller nodes, or any other network node. Although FIG. 4 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

At 410, it is determined that a serving access node is capable of transmitting a mMIMO signal. For example, the serving access node may include an access node of any type, including macrocell access nodes such as Long-Term-Evolution (LTE) eNodeBs or 5G New Radio (NR) gNodeBs, mini access nodes, home eNodeBs or gNodeBs, etc. Such serving access nodes may comprise a plurality of antennae configured to deploy a wireless sector, and to form transmission beams (including mMIMO beams) to specific locations such that wireless devices at the specific locations can receive the mMIMO beams.

At 420, a handover parameter is adjusted for wireless devices attached to the serving access node and receiving the mMIMO signal. The handover parameters can be adjusted such that wireless devices attached to mMIMO beams remain attached to the mMIMO beams despite being outside a coverage area of a sector of the serving access node. For example, adjusting the handover parameters includes lowering a signal level threshold of a reference signal transmitted from the serving access node. Thus, wireless devices attached to the serving access node and receiving mMIMO beams do not request a handover to a neighboring access node until the signal level threshold of the reference signal meets the low threshold. For example, the wireless devices may be traveling towards an edge of the coverage area of a sector deployed by the serving access node, and may even travel past the edge of the coverage area. Such wireless devices remain attached to the serving access node by virtue of the range of the mMIMO beam exceeding the range of the sector. In contrast, wireless devices that are attached to the serving access node but not receiving a mMIMO signal continue to be assigned standard handover parameters, such as a higher signal level threshold of the reference signal transmitted by the serving access node. Such wireless devices would request a handover to a neighboring access node based on standard handover parameters.

Figure 5:
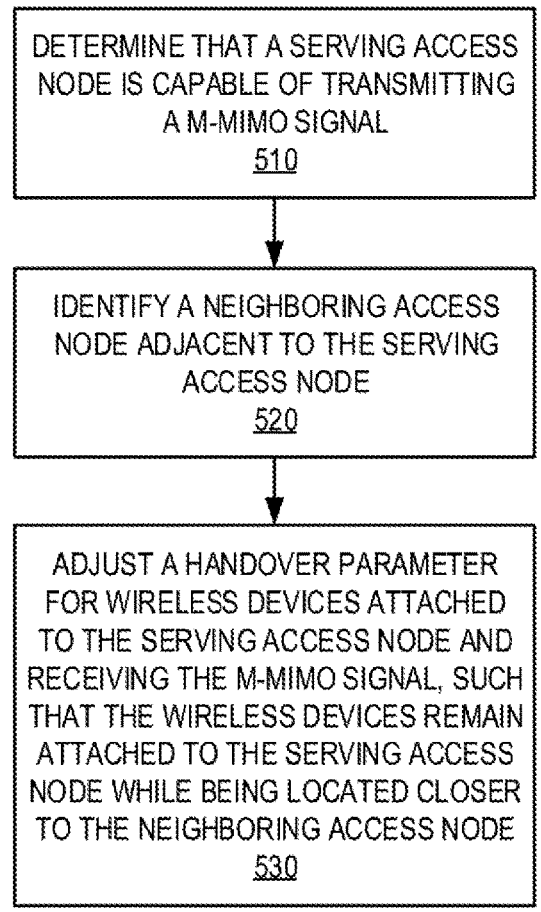
FIG. 5 depicts another exemplary method for adjusting handover parameters for mMIMO wireless devices.

FIG. 5 depicts an exemplary method for adjusting handover parameters. The method of FIG. 5 may be implemented by a processing node communicatively coupled to one or more serving access nodes, controller nodes, or any other network node. Although FIG. 5 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

At 510, it is determined that a serving access node is capable of transmitting a mMIMO signal. For example, the serving access node may include an access node of any type, including macrocell access nodes such as Long-Term-Evolution (LTE) eNodeBs or 5G New Radio (NR) gNodeBs, mini access nodes, home eNodeBs or gNodeBs, etc. Such serving access nodes may comprise a plurality of antennae configured to deploy a wireless sector, and to form transmission beams (including mMIMO beams) to specific locations such that wireless devices at the specific locations can receive the mMIMO beams.

At 520, a neighboring access node adjacent to the serving access node is identified, wherein there is an overlapping region between the coverage areas of both serving and neighboring access nodes. In exemplary embodiments, the serving access node can be configured to deploy a plurality of sectors, and a neighboring access node may be identified adjacent to each sector, such that each sector has a portion of its coverage area overlapping with a corresponding neighboring access node. Thus, at 530, a handover parameter is adjusted for wireless devices attached to the serving access node and receiving the mMIMO signal. The handover parameters can be adjusted such that wireless devices attached to mMIMO beams remain attached to the mMIMO beams despite being outside a coverage area of a sector of the serving access node. For example, adjusting the handover parameters includes lowering a signal level threshold of a reference signal transmitted from the serving access node. Thus, wireless devices attached to the serving access node and receiving mMIMO beams do not request a handover to a neighboring access node until the signal level threshold of the reference signal meets the low threshold. For example, the wireless devices may be traveling towards an edge of the coverage area of a sector deployed by the serving access node, and may even travel past the edge of the coverage area. Such wireless devices remain attached to the serving access node by virtue of the range of the mMIMO beam exceeding the range of the sector. In contrast, wireless devices that are attached to the serving access node but not receiving a mMIMO signal continue to be assigned standard handover parameters, such as a higher signal level threshold of the reference signal transmitted by the serving access node. Such wireless devices would request a handover to a neighboring access node based on standard handover parameters. Further, adjusting the handover parameter can include one or both of lowering a first signal level threshold of a first reference signal transmitted from the serving access node, or raising a second signal level threshold of a second reference signal transmitted from the neighboring access node. In effect, a first wireless device receiving the mMIMO signal remains attached to the serving access node until one or more of the first signal level threshold or the second signal level threshold is reached. For example, the first wireless device requests a handover to the neighboring access node when one or more of the first signal level threshold or the second signal level threshold is reached. In contrast, standard or default handover parameters are maintained for sector wireless devices (i.e. wireless devices not receiving the mMIMO signal), such that a sector wireless device requests a handover to the neighboring access node when standard or default signal level thresholds are met. Further, the standard or default handover parameters may be maintained for any wireless device not receiving the mMIMO signal, such as wireless devices that are not attached to any sector deployed by the serving access node. Such wireless devices may attempt to attach to the serving access node based on the default handover parameters. For example, a wireless device located outside the coverage area of the sector and approaching the edge of the sector may request a handover (or to attach) to the serving access node based on the standard or default signal level threshold of the reference signal transmitted from the serving access node.

In an exemplary embodiment, the neighboring access node may also be capable of transmitting a mMIMO signal. In these embodiments, a second handover parameter for wireless devices attached to the neighboring access node may be defined, such that a wireless device receiving the second mMIMO signal remains attached to the neighboring access node while being located outside an edge of the coverage area of the neighboring access node. For example, adjusting the second handover parameter can include one or both of lowering a signal level threshold of the second reference signal transmitted from the neighboring access node, or raising a signal level threshold of the first reference signal transmitted from the serving access node. As a result, the wireless device receiving the second mMIMO signal remains attached to the neighboring access node until one or more of the adjusted signal level thresholds are reached. Conversely, sector wireless devices attached to the neighboring access node request handovers based on default or standard handover parameters, such as default or standard signal level thresholds.

Figure 6:
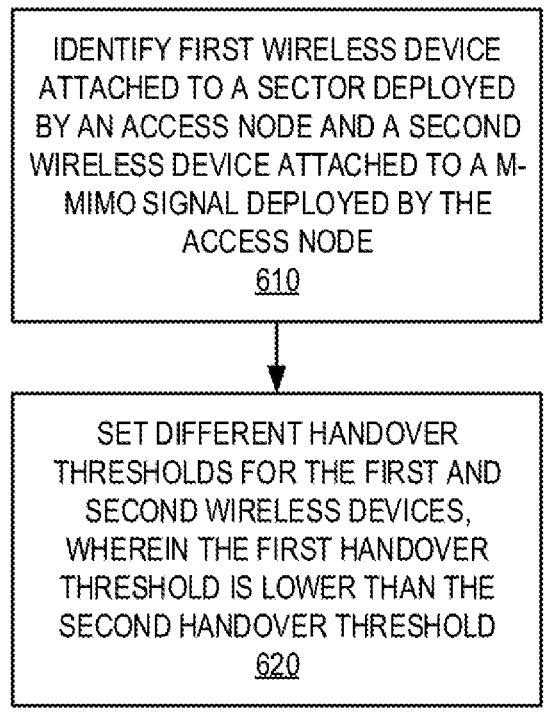
FIG. 6 depicts another exemplary method for adjusting handover parameters for mMIMO wireless devices.

FIG. 6 depicts an exemplary method for adjusting handover parameters. The method of FIG. 6 may be implemented by a processing node communicatively coupled to one or more serving access nodes, controller nodes, or any other network node. Although FIG. 6 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

At 610, a first wireless device attached to a sector deployed by a first access node is identified, and a second wireless device attached to a mMIMO signal deployed by the first access node is identified. At 620, different handover parameters are defined (or set) for the first and second wireless devices. A first handover parameter for the first wireless device is set lower than a second handover parameter for the second wireless device, such that a first handover of the first wireless device to a target access node is performed when the first handover parameter is reached, and a second handover of the second wireless device to the target access node is performed when the second handover parameter is reached. In effect, the second wireless device is handed over to the target access node at a further distance away from the first than the first wireless device, so as to retain the benefit of the mMIMO signal.

Figure 7:
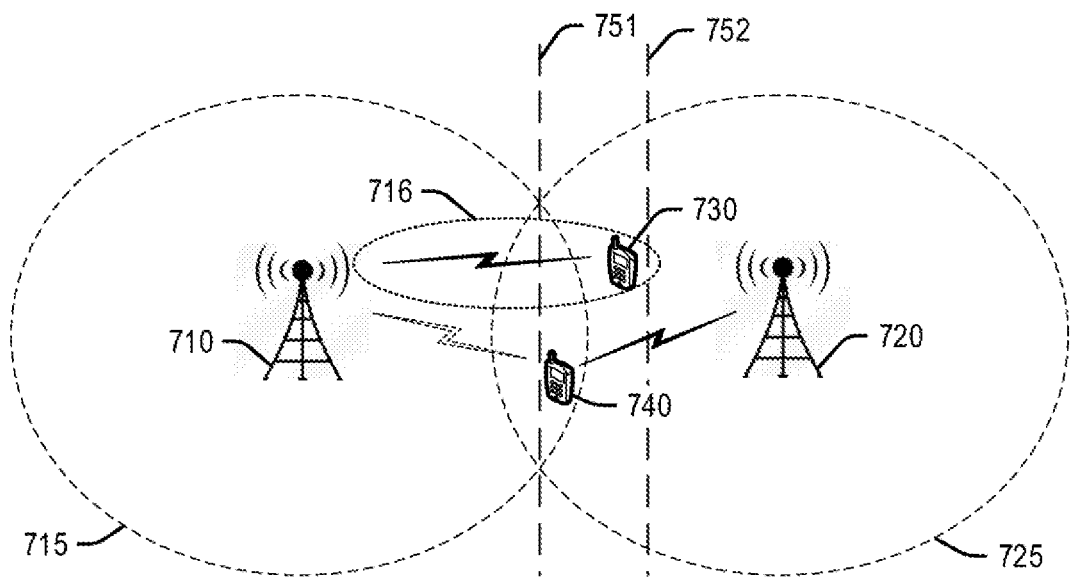
FIG. 7 depicts another exemplary system for adjusting handover parameters for mMIMO wireless devices.

FIG. 7 depicts a system wherein handover parameters are adjusted for mMIMO wireless devices and default handover parameters are maintained for sector wireless devices. Access node 710 is configured to deploy a radio air interface over a coverage area 715, and access node 720 is configured to deploy a radio air interface over a coverage area 725. Further, access node 710 is illustrated as deploying a mMIMO signal 716 over a coverage area that extends beyond sector coverage area 715. Thus, wireless device 730 is illustrated as being in communication with access node 710 via mMIMO beam 716, despite the location of wireless device 730 being outside of sector coverage area 715. A processing node communicatively coupled to access nodes 710, 720, or any other network node) can be configured to adjust one or more handover parameters for mMIMO wireless device 730 responsive to determining that the serving access node 710 is capable of transmitting the mMIMO signal 716. For example, the serving access node 710 may comprise a plurality of antennae configured to deploy one or more wireless sectors over a coverage area 715, and to form transmission beams (including mMIMO signal/beam 716) to specific locations, such that wireless devices at the specific locations (such as wireless device 730) can receive the mMIMO signal 716. The handover parameters can be adjusted such that mMIMO wireless devices attached to mMIMO beams remain attached to the mMIMO beams despite being outside sector coverage area 715. For example, adjusting the handover parameters includes lowering a signal level threshold of a reference signal transmitted from the serving access node 710. Thus, mMIMO wireless device 730 does not request a handover to the neighboring access node 720 until the signal level threshold of the reference signal meets the low threshold. If mMIMO wireless device 730 is traveling past the edge of the sector coverage area 715, it therefore remains attached to the serving access node 710 by virtue of the range of the mMIMO signal 716 exceeding the sector coverage area 715. In contrast, sector wireless device 740 (that is attached to the serving access node 710 but not receiving a mMIMO signal) continues to be assigned standard handover parameters, such as a higher signal level threshold of the reference signal transmitted by the serving access node 710. Thus, while sector wireless device 740 requests a handover to neighboring access node 720 when it passes past a standard handover location (indicated by dashed line 751), mMIMO wireless device 730 only requests a handover when it passes an adjusted handover location (indicated by dashed line 752).

Further, adjusting the handover parameter can include one or both of lowering a first signal level threshold of a first reference signal transmitted from the serving access node 710, or raising a second signal level threshold of a second reference signal transmitted from the neighboring access node 720. In effect, mMIMO wireless device 730 remains attached to the serving access node 710 until one or more of the first signal level threshold or the second signal level threshold is reached. For example, the mMIMO wireless device 730 requests a handover to the neighboring access node 720 when one or more of the first signal level threshold or the second signal level threshold is reached. The adjusted signal level thresholds may be defined such that the handover is performed for mMIMO wireless device 730 at adjusted handover location 752. In contrast, standard or default handover parameters are maintained for sector wireless device 740 such that sector wireless device 740 requests a handover to the neighboring access node 720 when standard or default signal level thresholds are met at standard handover location 751. Further, the standard or default handover parameters may be maintained for any wireless device not receiving the mMIMO signal, such as wireless devices that are not attached to any sector deployed by the serving access node 710. For example, a wireless device located outside the coverage area of the sector 715 (not shown herein) and approaching the edge of the sector 715 may request a handover (or to attach) to the serving access node 710 at handover location 751, and not at handover location 752.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method for adjusting handover parameters for access nodes capable of transmitting massive multiple-input multiple-output (mMIMO) signals, the method comprising:
    determining that a serving access node is capable of transmitting a mMIMO signal;
    identifying a neighboring access node adjacent to the serving access node, wherein there is an overlapping region between the coverage areas of both serving and neighboring access nodes; and
    adjusting a handover parameter for wireless devices attached to the serving access node and receiving the mMIMO signal from the serving access node
    wherein adjusting the handover parameter comprises one or both of: lowering a first signal level threshold of a first reference signal transmitted from the serving access node, or raising a second signal level threshold of a second reference signal transmitted from the neighboring access node.

2. The method of claim 1, wherein a first wireless device receiving the mMIMO signal remains attached to the serving access node while being located outside an edge of a coverage area of the serving access node.

3. The method of claim 2, wherein the first wireless device is traveling in a direction away from the serving access node.

4. The method of claim 1, wherein a first wireless device receiving the mMIMO signal remains attached to the serving access node until one or more of the first signal level threshold or the second signal level threshold is reached.

5. The method of claim 4 wherein the first wireless device requests a handover to the neighboring access node when one or more of the first signal level threshold or the second signal level threshold is reached.

6. The method of claim 1, further comprising:
    determining that the neighboring access node is capable of transmitting a second mMIMO signal; and
    adjusting a second handover parameter for wireless devices attached to the neighboring access node,
    wherein, based on the adjusted second handover parameter, a second wireless device receiving the second mMIMO signal remains attached to the neighboring access node while being located outside an edge of the coverage area of the neighboring access node.

7. The method of claim 6, wherein adjusting the second handover parameter comprises one or both of: lowering a third signal level threshold of the second reference signal transmitted from the neighboring access node, or raising a fourth signal level threshold of the first reference signal transmitted from the serving access node.

8. The method of claim 7, wherein the second wireless device remains attached to the neighboring access node until one or more of the third signal level threshold or the fourth signal level threshold is reached.

9. The method of claim 1, further comprising maintaining a default handover parameter for wireless devices not receiving the mMIMO signal.

10. A system for adjusting handover parameters for access nodes capable of transmitting massive multiple-input multiple-output (mMIMO) signals, the system comprising:
    a processing node; and
    a processor coupled to the processing node, the processor being configured to perform operations comprising:
        determining that a serving access node is capable of transmitting a mMIMO signal;
        identifying a neighboring access node adjacent to the serving access node, wherein an overlapping region exists between coverage areas of the serving access node and the neighboring access node; and
        adjusting a handover parameter for wireless devices attached to the serving access node such that a first wireless device receiving the mMIMO signal and located closer to the neighboring access node remains attached to the serving access node;
    wherein adjusting the handover parameter comprises one or both of: lowering a first signal level threshold of a first reference signal transmitted from the serving access node, or raising a second signal level threshold of a second reference signal transmitted from the neighboring access node.

11. The system of claim 10, wherein the first wireless device remains attached to the serving access node until one or more of the first signal level threshold or the second signal level threshold is reached.

12. The system of claim 11 wherein the first wireless device requests a handover to the neighboring access node when one or more of the first signal level threshold or the second signal level threshold is reached.

13. The system of claim 10, further comprising:
    determining that the neighboring access node is capable of transmitting a second mMIMO signal; and
    adjusting a second handover parameter for wireless devices attached to the neighboring access node.

14. The system of claim 13 wherein, based on the adjusted second handover parameter, a second wireless device attached to the neighboring access node and traveling away from the center of a coverage area of the neighboring access node towards an edge of the coverage area of the neighboring access node remains attached to the neighboring access node.

15. A processing node for adjusting handover parameters for access nodes capable of transmitting massive multiple-input multiple-output (mMIMO) signals, the processing node being configured to perform operations comprising:
    determining that a serving access node is capable of transmitting a mMIMO signal;
    identifying a neighboring access node adjacent to the serving access node, wherein there is an overlapping region between the coverage areas of both serving and neighboring access nodes; and
    adjusting a handover parameter for wireless devices attached to the serving access node and receiving the mMIMO signal from the serving access node,
    wherein adjusting the handover parameter comprises one or both of: lowering a first signal level threshold of a first reference signal transmitted from the serving access node, or raising a second signal level threshold of a second reference signal transmitted from the neighboring access node.

16. The processing node of claim 15, wherein a first wireless device receiving the mMIMO signal remains attached to the serving access node while being located outside an edge of a coverage area of the serving access node.

17. The processing node of claim 16, wherein the first wireless device is traveling in a direction away from the serving access node.

18. The processing node of claim 15, wherein a first wireless device receiving the mMIMO signal remains attached to the serving access node until one or more of the first signal level threshold or the second signal level threshold is reached.

* * * * *